Oct. 21, 1952 W. H. WANNAMAKER, JR 2,615,151
OSCILLATOR CONTROLLED MEASURING AND CONTROLLING APPARATUS
Original Filed June 22, 1944  2 SHEETS—SHEET 1

*INVENTOR.*
WILLIAM H. WANNAMAKER JR
BY
Arthur H. Swanson
ATTORNEY.

Oct. 21, 1952  W. H. WANNAMAKER, JR  2,615,151
OSCILLATOR CONTROLLED MEASURING AND CONTROLLING APPARATUS
Original Filed June 22, 1944  2 SHEETS—SHEET 2

INVENTOR.
WILLIAM H. WANNAMAKER JR.
BY
Arthur H. Swanson
ATTORNEY.

Patented Oct. 21, 1952

2,615,151

UNITED STATES PATENT OFFICE 2,615,151

OSCILLATOR CONTROLLED MEASURING AND CONTROLLING APPARATUS

William H. Wannamaker, Jr., Flourtown, Pa., assignor to Minneapolis-Honeywell Regulator Company, Minneapolis, Minn., a corporation of Delaware Original application June 22, 1944, Serial No. 541,576, now Patent No. 2,514,918, dated July 11, 1950. Divided and this application May 14, 1949, Serial No. 93,213

2 Claims. (Cl. 318—223)

The general object of the present invention is to provide a novel control motor drive combination including an alternating current motor, and motor energizing means operative to rotate the motor continuously in one direction during each period in which the value of a control quantity or condition is within a certain range, and to maintain the motor stationary during periods in which the value of said quantity or condition is not within said range.

More specifically stated, the object of the present invention is to provide a motor drive combination in which the energizing winding of an alternating current motor of the shaded pole type is included in a circuit network comprising two motor drive electronic valves, and provisions responsive to variations in the value of a controlling quantity or condition for causing one of said valves to oscillate when the value of said quantity or condition is not within a predetermined range, and with said valves so arranged that when said one valve is not oscillating, the two valves supply energizing current to said winding during alternate halves of each cycle of the alternation of the alternating current supplied to the network to energize the latter.

My novel motor drive combination is characterized by its mechanical simplicity, small current requirement, small frictional losses and positive operation.

This application is a division of my prior application Serial No. 541,576, filed June 22, 1944, now Patent No. 2,514,918, July 11, 1950, which discloses and claims novel subject matter disclosed but not claimed herein.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Figure 1:
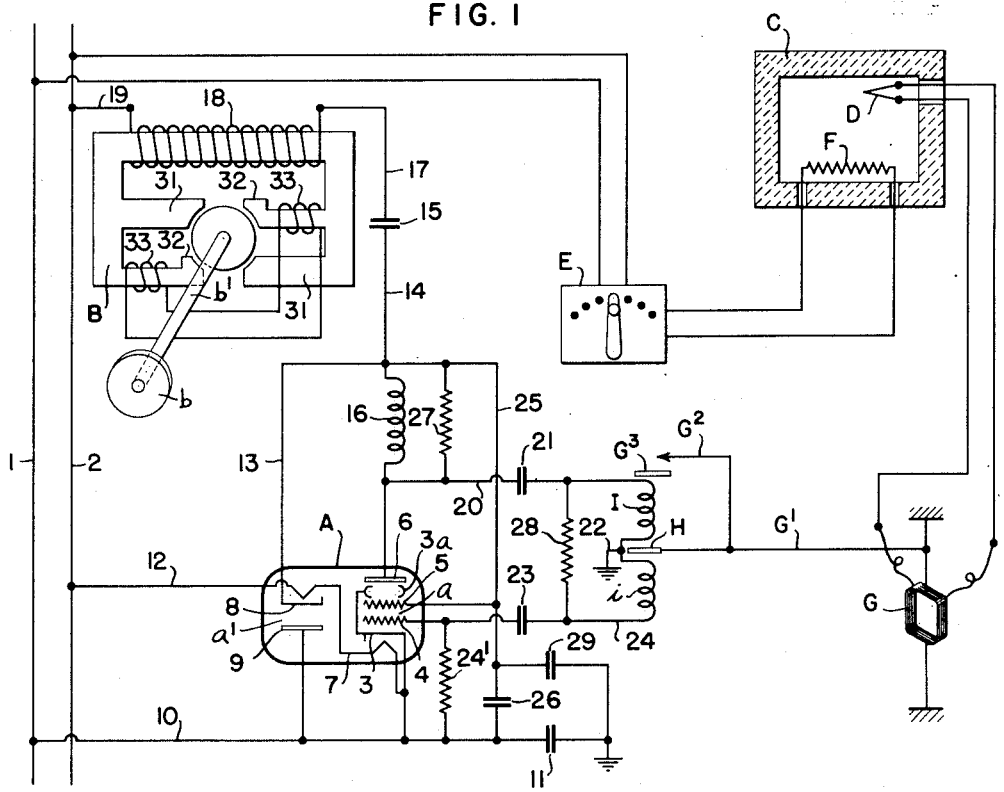
Fig. 1 is a diagrammatic representation of one embodiment of the invention.

In Fig. 1, I have diagrammatically illustrated an embodiment of my present invention energized by alternating current supplied by conductors 1 and 2, and in which a diodetetrode tube A is employed to actuate a motor B in accordance with variations in the temperature in a furnace C to which a thermocouple D is responsive. The motor B is arranged to rotate only during periods in which the furnace temperature exceeds a predetermined value. A device $b$ rotated by the shaft $b'$ of the motor B, may serve one or another of various purposes. For example, it may integrate the time intervals during which the furnace temperature exceeds a predetermined value in the general manner illustrated in Fig. 2. Alternatively, the device $b$ may serve as a visual or aural indicator of the furnace temperature, to which the thermocouple D is responsive, or of the need for adjustment of the furnace heat supply by manual adjustment of a controller E regulating the current to a furnace heating resistor F.

As diagrammatically shown in Fig. 1, the thermocouple D is connected to the terminals of a galvanometer G including a deflecting arm $G^1$ carrying a control element H at its free end, and also carrying a pointer $G^2$ cooperating with a scale $G^3$ to indicate the thermocouple temperature. In the arrangement shown in Fig. 1 the controlling element H is a sheet metal vane which operates as an induction shield to regulate the mutual inductance of juxtaposed inductance coils I and $i$ as is hereinafter more fully explained.

As shown in Fig. 1, the tube A is of the type and form known as a rectifier-beam power amplifier tube, type 117N7GT. The tetrode valve $a$ in the tube A comprises a cathode 3 and associated beam plates $3a$, a control grid 4, a screen grid 5, an anode or plate 6, and a filament 7 for heating both the cathode 3 of the valve $a$ and the cathode 8 of the diode valve $a'$. The diode plate 9, one terminal of the filament 7 and the cathode 3 are all connected to an energizing conductor 10 which is a branch of the supply conductor 1, and is connected to ground through a condenser 11. The second terminal of the filament 7 is connected to the supply conductor 2 by a conductor 12. The cathode 8 of the diode is connected by a conductor 13 to one terminal 14 of a condenser 15. The tetrode plate 6 is connected to the condenser terminal 14 through an inductance 16. The second terminal of the condenser 15 is connected by a conductor 17 to one terminal of the winding 18 which forms the energizing element of the motor B. The second terminal of the winding 18 is connected by a conductor 19 to the supply conductor 2.

The value of condenser 15 is so chosen in relation to the inductance of the energizing winding 18 that the condenser 15 and energizing winding 18 form a series resonant circuit. With this value for the condenser 15 the voltage drop across the energizing winding 18 is of approximately the same magnitude as the voltage of the supply conductors 1 and 2, as is also the voltage drop across the condenser 15 and also across the tube A. Such choice of the value of condenser 15, therefore, is advantageous in that it permits full line voltage to be impressed on the winding 18.

The tetrode plate 6 is connected by a conductor 20 and a condenser 21 to one terminal of the inductance or control coil I. The second terminal of the coil I is connected to a ground connection 22 to which is also connected one terminal of the second inductance or control coil $i$. The second terminal of the last mentioned coil is connected by a condenser 23 and conductor 24 to the tetrode control grid 4, and the latter is connected to the cathode 3 by a resistance 24'. The terminal 14 of the condenser 15 is connected through a conductor 25 to the screen grid 5 and to a condenser 26 which connects the conductor 25 to the conductor 10 and thereby to the supply conductor 1. As shown, a resistance 27 is connected in shunt to the inductance coil 16; the outer terminals of coils I and $i$ are connected by a resistance 28; and a condenser 29 connects conductor 25 to ground.

The motor B is a shaded pole, alternating current motor having its main poles 31 energized by current flow through the energizing winding 18 and having each of its shading poles 32 surrounded by a short circuited winding 33. The energizing winding 18 is connected between the condenser terminal 17 and the supply conductor 2. In the contemplated operation of the apparatus shown in Fig. 1, the motor B runs continuously in one direction during periods in which the mutual inductance of the control coils I and $i$ is not great enough to cause the valve $a$ of the tube A to oscillate, and is stationary during periods in which valve $a$ oscillates.

In the form of the invention shown in Fig. 1, the actuating coil 18 of the motor B constitutes a control circuit load which is connected between the supply conductors 1 and 2 in series with the condenser 15 and with each of the two electronic valves which are in parallel with one another. Since the plate 6 of the multi-grid valve $a$ and the cathode 8 of the diode valve $a'$ are connected to the same side of the condenser 15, the diode plate current flows from the cathode 8 to the condenser terminal 14 during half cycle intervals which alternate with half cycle intervals during which the grid valve plate current flows from the condenser terminal 14 to the plate 6. By reason of the potential of the condenser 15, built up by the conduction of the grid or power tube valve $a$ during its half cycle of line power operation, the conduction of the rectifier or diode valve is controllable. Thus the load element or motor winding 18 receives a full wave current which is controlled by controlling the conduction of the multi-grid valve section of the system, although the latter operates only during a portion of the full wave current cycle.

With the arrangement shown in Fig. 1, it is thus possible to control the full wave current flow through the coil 18 by regulating the conduction of the grid valve section of the system. That regulation may be effected in various ways. As shown diagrammatically in Fig. 1, the conduction of the grid valve section is regulated by varying the position of the vane H relative to the inductance coils I and $i$, and thereby so varying the mutual inductance of the coils that the grid valve $a$ will not oscillate when the thermocouple temperature D is at, or above, the desired value, and will oscillate when the thermocouple temperature is lower.

When the thermocouple temperature is so low as to result in grid valve oscillation, the current flow through each valve is small and the resultant current flow through the motor winding 18 does not operatively energize the motor B. When the temperature of the thermocouple D is at or above the desired value, the galvanometer G moves the vane H into a position in which it so reduces the mutual inductance of the coils I and $i$ that the valve $a$ ceases to oscillate. When this occurs, the current flow through the grid valve section of the system becomes relatively high as does the current flow through the diode valve of the system. In consequence, the current flow through the motor winding 18 is then sufficient to maintain the rotation of the motor B and device $b$.

The inductance of the coil 18 is advantageously so related to the capacitance of the condenser 15 as to tune the circuit including them and thus further raise the voltage of the condenser 15. The full wave current flow through the coil 18 provides about twice as much energy for the actuation of the motor B as would be available if the diode valve $a'$ did not supply current during the half cycle period in which the current flow through the multi-grid valve is interrupted.

The control system shown in Fig. 1 is thus characterized by its inherent capacity for supplying sufficient power for the positive operation of the motor B. While other means for regulating the condition of the multi-grid valve section of the system may be used, the means shown in Fig. 1 are especially advantageous because of the inherent simplicity, reliability and sensitivity of operation of the inductance coils I and $i$ and inductance shield vane H when they are suitably formed and disposed. A practically desirable arrangement of said coils and vane is illustrated in Figs. 2 and 3.

Figure 3:
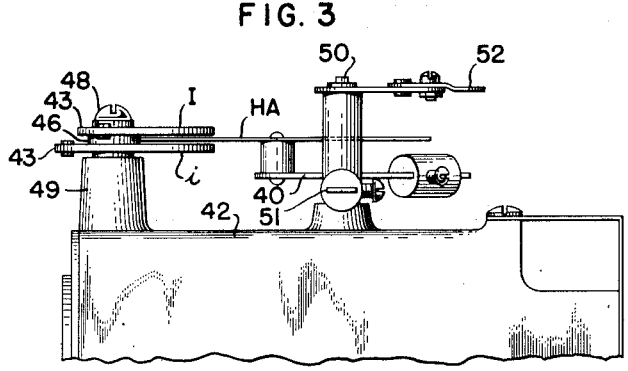
Fig. 3 is an inverted plan view of the control vane portion of the apparatus shown in Fig. 2.
Figure 2:
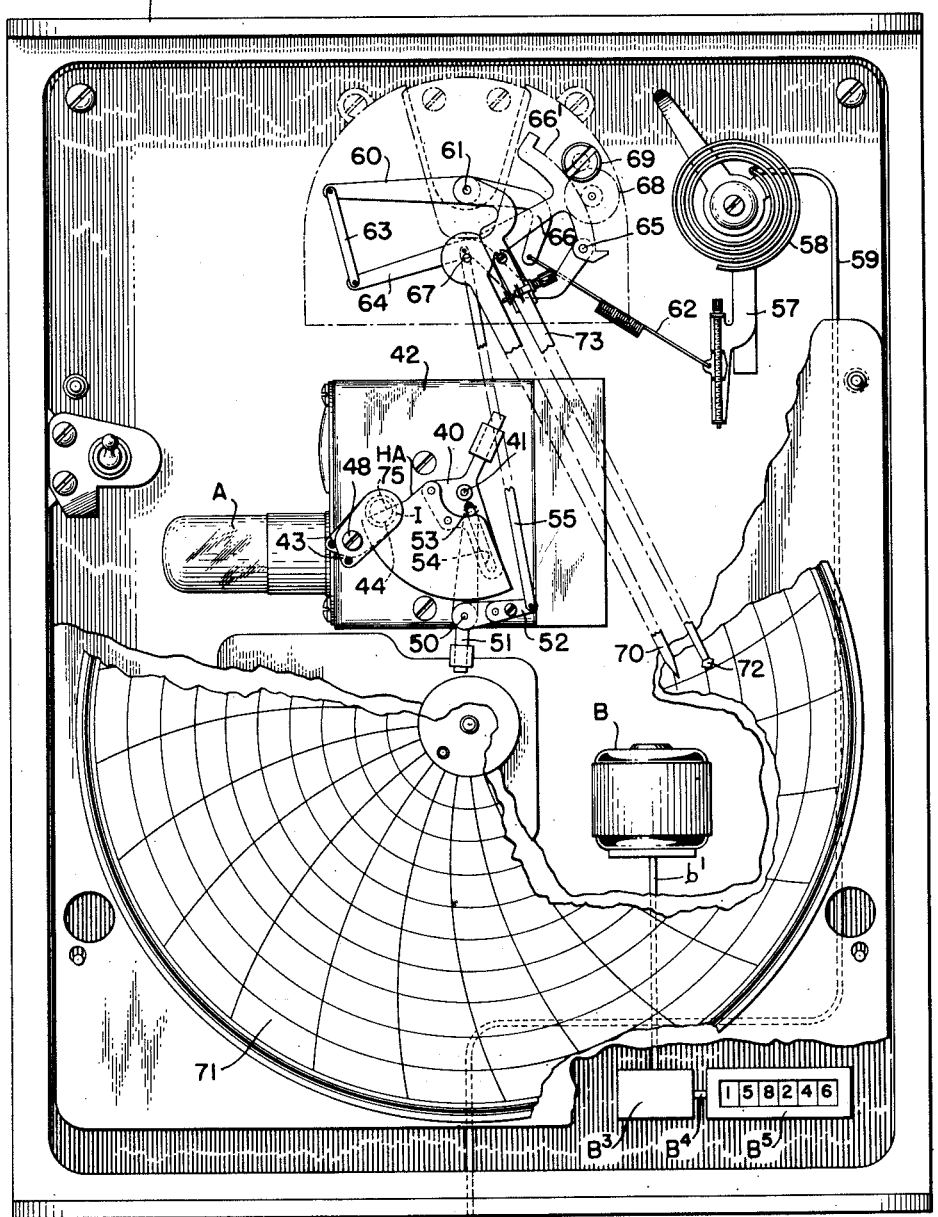
Fig. 2 is an elevation with parts broken away of a control instrument including the apparatus shown in Fig. 1.

In Figs. 2 and 3, I have illustrated the use of the invention shown diagrammatically in Fig. 1 in a measuring instrument GA to provide an integration of the time intervals during which the value of a quantity measured by the instrument exceeds a predetermined value. The instrument GA includes a vane HA which differs in form but not in principle of operation from the vane H. The vane HA is an arc shaped body of sheet metal of good conductivity, such as aluminum, copper or brass attached to a rotatable support 40. The latter is mounted on a horizontal pivot 41 carried by the mechanism casing 42 and is suitably counterweighted to free the vane from gravitational bias. The inductance coils I and $i$ are flat spirals each mounted on an individual support 43. In the practically desirable form illustrated, the two supports 43 are counterparts. The two coil supports 43 are advantageously connected to form a single mechanical unit by a metallic eyelet or hub part 46 which extends through a portion of each support displaced from its boss 44. As shown in Figs. 2 and 3, the unit including the coils I and $i$ and their supports 43 are detachably secured by a clamping screw 48 to the end of a post portion 49 of the casing 42.

The inductance coil construction just described is mechanically simple and relatively inexpensive and is especially desirable because it permits the coils I and $i$ to be accurately spaced desirably close to one another, so that a very small angular movement of the sheet metal vane HA in the inner kerf-like space between the two coils may produce a relatively large change in the mutual inductance of the coils, while permitting each of the latter to comprise but a few turns or convolutions. The construction and arrangement of the supports 43 and the coils I and $i$ are fully disclosed in my above mentioned application, and are also described and are claimed in my prior application Serial No. 541,575, filed June 22, 1944, and now Patent No. 2,531,313 of November 21, 1950.

In the instrument shown in Fig. 2, the vane HA is oscillated about the pivot 41 through a pin and slot connection between the vane support 40 and a rocker or lever element mounted on a pivot pin 50 and comprising two lever arms 51 and 52. The arm 51 carries a pin 53 received in an elongated slot 54 formed in the vane support 40 and extending in a general radial direction away from the pivot 41. The second arm 52 of the rocker element is pivotally connected to one end of an actuating link 55 which has its second end connected through a lever and link arrangement of known type to an arm 57 oscillating in accordance with changes in the value of the controlling condition. As shown in Fig. 2, the arm 57 is connected to the free end of a Bourdon tube 58 which has its other end anchored to the instrument casing and connected to one end of a capillary tube 59 through which a variable controlling fluid pressure is transmitted to the Bourdon tube 58. In consequence, the arm 57 oscillates about the axis of the Bourdon tube in the clockwise or counter-clockwise direction, as the pressure transmitted by the capillary 59 respectively decreases or increases.

The known type of link and lever arrangement through which the link 55 is adjusted longitudinally in accordance with angular adjustments of the arm 57, comprises a lever element 60 journaled on a pivot 61 carried by the instrument casing and having one arm connected by a link 62 to the arm 57. A second arm of the lever 60 is connected by a link 63 to one end of a floating lever 64. The other end of the floating lever 64 is pivotally connected by a pivot 65 to a control point adjusting element 66. The latter is pivotally mounted on a pivot pin 67 carried by the instrument casing. The element 66 may be angularly adjusted about the pivot 67 by means including a spur gear 68 in mesh with a spur gear portion 66' of the member 66. The spur gear 68 may be rotated by gearing including an adjusting shaft 69 journaled on the instrument casing, and shown as formed with a kerf in one end for screwdriver adjustment. The end of the link 55 remote from the rocker arm 52 is pivotally connected to the floating lever 64 intermediate the ends of the latter. The member 66 includes an index arm 70 which indicates on the rotating instrument chart 71 the control point or value which the instrument is intended to maintain approximately constant. The actual value of that control condition is indicated and recorded on the chart 71 by a pen 72 carried at the free end of a pen arm 73 mechanically connected to the lever 60 so as to turn about the pivot 61 in accordance with changes in the value of the pressure transmitted by the capillary 59.

The Bourdon spiral 58 may be connected through the capillary tube 59 to any controlling fluid pressure source. Thus, for example, that source may be a fluid pressure thermometer bulb DA as shown in Fig. 2, and in such case the instrument GA may be employed in the control system shown diagrammatically in Fig. 1 to give the vane HA oscillatory movements relative to the coils I and $i$ on changes in the temperature of the bulb DA which are similar to the relative movements of the vane H and coils produced in the particular arrangement shown in Fig. 1 by the response of the galvanometer G to variations in the voltage of the thermocouple D. Regardless of the origin of the controlling pressure, its decrease or increase effects a turning movement of the vane HA clockwise or counter-clockwise respectively about its pivot 41.

The exact angular position of the vane HA at which the valve will cease to oscillate depends on various control system constants. Ordinarily, however, it will be a position in which the vane edge 75 extends between the bosses 44 of the two coil supports 43 approximately as shown in Fig. 2. Control apparatus comprising an electronic valve adapted to be adjusted into or out of an oscillating condition by changes in the relative positions of an inductance shield vane HA and inductance coils I and $i$ of the type and form shown in Figs. 2 and 3, may be so constructed and arranged that the valve $a$ will be caused to oscillate or to cease from oscillation by a movement of the portion of the vane edge 75 adjacent the axes of the coils I and $i$, of the order of one or two thousandths of an inch.

With the pin and slot connection between the rocker arm 51 and the vane HA shown in Fig. 2, the ratio of the angular movement of the vane and rocker arm is relatively very large when the pin 53 is close to the pivot 41 and to the plane including the axes of the pivots 41 and 50, and said ratio diminishes as the pin moves away from said plane. Advantage of the pin and slot connection characteristic just mentioned, may be taken to make the instrument especially sensitive in the range of vane movement in which such sensitivity is especially important. Usually maximum sensitivity is especially desirable when the vane is in and near the position at which oscillation begins and stops. No claim is made herein on said pin and slot arrangement, as that arrangement was invented by Edwin C. Burdick, and is claimed in his application Ser. No. 541,510, filed June 22, 1944, and now Patent No. 2,481,820 of September 13, 1949.

For the purposes of the present invention, the motor B included in the instrument GA has its shaft $b'$ connected through suitable speed reducing gearing $B^3$ to the shaft $B^4$ of a counting train $B^5$, to thereby provide an integration of the time intervals during which the temperature of the pressure bulb DA exceeds the desired value. In operation with a small steady load such as the integrator $B^5$, the motor B of Fig. 2 operates as a synchronous motor having a speed which is in predetermined constant proportion to the frequency of the alternating current supplied by the supply condensers 1 and 2.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. A motor drive mechanism comprising in combination, an alternating current motor having main poles and shading poles, a short circuited winding energizing said shading poles, a circuit network having a pair of terminals adapted to be connected across a source of alternating current, and including a winding energizing said main poles, a condenser, and two electronic valves connected between said terminals in parallel with one another and in series with said winding and condenser, one of said valves being a diode and the second valve having a control grid and having its cathode connected to the anode of said diode so that current may flow through each valve during half cycles alternating with those during which current flows through the other valve, and means responsive to a control condition for impressing a control voltage on said control grid varying in accordance with variations in the value of said condition.

2. A motor drive mechanism as specified in claim 1, in which said network includes a reactive coupling between the anode and control grid of said second valve operative to cause or prevent oscillation of said second valve, and thereby effectively energize or de-energize said motor, accordingly as the value of said condition varies in one direction or the other through a predetermined range.

WILLIAM H. WANNAMAKER, Jr.

REFERENCES CITED

The following references are of record in the file of this patent:

UNITED STATES PATENTS

| Number | Name | Date |
| --- | --- | --- |
| 1,993,527 | Mears et al. | Mar. 5, 1935 |
| 2,112,683 | Wooley | Mar. 29, 1938 |
| 2,351,760 | Beers | June 20, 1944 |
| 2,411,247 | Cohen | Nov. 19, 1946 |
| 2,473,494 | Wannamaker | June 14, 1949 |
| 2,514,918 | Wannamaker | July 11, 1950 |